United States Patent [19]

Brandner

[11] Patent Number: 4,639,607

[45] Date of Patent: Jan. 27, 1987

[54] DEVICE FOR SENSING A RECORDING MEDIUM IN A LINE PRINTER

[75] Inventor: Alois Brandner, Munich, Fed. Rep. of Germany

[73] Assignee: Siemens Aktiengesellschaft, Berlin and Munich, Fed. Rep. of Germany

[21] Appl. No.: 678,498

[22] Filed: Dec. 5, 1984

[30] Foreign Application Priority Data

Dec. 13, 1983 [DE] Fed. Rep. of Germany ....... 3345030

[51] Int. Cl.[4] ................................ G01N 9/04

[52] U.S. Cl. ................................ 250/561; 250/223 R

[58] Field of Search ............... 250/557, 559, 560, 561, 250/562, 571, 223 R; 356/429

[56] References Cited

U.S. PATENT DOCUMENTS 3,739,177 6/1973 Ko ................................ 250/561 X

FOREIGN PATENT DOCUMENTS 2951934 7/1981 Fed. Rep. of Germany .

0053436 4/1980 Japan ................................ 250/561

*Primary Examiner*—Eugene R. LaRoche
*Assistant Examiner*—Steven J. Mottola
*Attorney, Agent, or Firm*—Hill, Van Santen, Steadman & Simpson

[57] ABSTRACT

The present invention is directed to a sensing device for a printing apparatus which has a printing head that moves line-wise along a recording medium that is conducted across a reflective surface. The sensing device includes a source of radiation projected onto an area of the reflective surface adjacent to the area or spot of printing and a radiation receiving device for receiving a reflected beam of radiation from the spot, which receiving device has a convergent lens system positioned in the path of the reflected beam of radiation and positioned with the focal point being approximately at the reflective spot or area so that the lens system directs beams deflected from the desired path onto the receiving surface due to deformations in the reflective surface.

11 Claims, 2 Drawing Figures

DEVICE FOR SENSING A RECORDING MEDIUM IN A LINE PRINTER

BACKGROUND OF THE INVENTION

The present invention is directed to a sensing device or apparatus of a printing apparatus or device. The sensing device is mounted or coupled with a printing head of the printing device which printing head moves along the recording medium which is in turn conducted over a reflective surface. The sensing device includes a radiation source for projecting radiation at the recording medium and a photoelectric receiving means for sensing radiation which has been reflected by the reflective surface to determine whether or not the recording medium is present.

Sensing devices of the type in which light is reflected from a reflective surface and detected to determine the presence of a recording medium are generally known and have been successfully employed. An example of such a device is disclosed in German OS No. 29 51 934 and this device has a writing head which is moved line-wise along the recording medium and a sensing means, which includes a radiation source and a photoelectric receiving means, is provided in the writing head for sensing the edges of the recording medium. To eliminate problems from outside light, the sensing is done pulse-wise. The recording medium is conducted over a reflective surface which will reflect the light beam proceeding from the radiation source to the receiving means in those regions of the reflective surface that is not covered by the paper of the recording medium.

A light-emitting diode is employed as a radiation source. This light-emitting diode will emit a relatively highly focused light beam which is received by a phototransistor after reflection by the reflective surface.

A significant problem with photosensors, however, consists therein that they are relatively sensitive to changes in the direction of the reflected light beam so that a slight departure of the reflective surface from its rated position leads to the fact that the sensing beam no longer reaches the receiver with full intensity. This will lead to a misinterpretation and misconnection in the region of the post-processing electronics under certain conditions. Since the reflective surface given such a device must be disposed in the region of the platen and the recording medium is conducted over the reflective surface, pivoting or, respectively, local distortions of the reflective surface, which will deflect or scatter light beams away from the photosensor, can easily occur.

Given the employment of a light-emitting diode and phototransistors in the sensing device, it is usual to proceed or follow the sensor surface or, respectively, the non-emitting surface with an optical system. For example, lenses are utilized in order to either focus the light to be emitted or on the other hand to concentrate the received light on the actual receptive surface of the receiver.

In the U.S. Pat. No. 3,739,177, for example, a sensing means for recognizing the edge of a paper web is disclosed. This sensing means has a lamp, which is provided as a radiation source. A convergent lens is allocated to the lamp and focuses the light proceeding from the lamp as it is supplied to the sensing region. At the receiver side, a convergent lens is in turn provided in front of the photosensitive element and collects the light reflected from the sensing surface and concentrates it on the receptor surface of the photosensitive element.

SUMMARY OF THE INVENTION

The object of the present invention is to offer an apparatus or device for detecting or sensing the presence of a recording medium which apparatus or device has a greater tolerance for misdirection of the reflected beam and is of a simple structure. Thus, slight directional fluctuations of the reflected sensing beam should not have an effect on the functionability of the sensing device.

To accomplish these goals, the present invention is directed to an improvement in a sensing device for a printing device which has a printing head movable line-wise along a recording medium which is conducted over a reflective surface, said sensing device including sensing means being coupled to move with the printing head for determining the presence of the recording medium in front of the reflective surface, said sensing means comprising a radiation source for directing radiation at an area of the reflective surface and a photoelectric receiving means for receiving radiation reflected from said area by the reflective surface. The improvements are that the sensing means includes a convergent lens system being disposed in front of the receiving means, said convergent lens system having a focal point situated in the immediate proximity of the area of the reflective surface so that the convergent lens system planarly projects the reflected radiation beam onto a reception area or surface of the receiving means even when the beam is deflected from a desired line of reflection.

Preferably, the convergent lens system consists of a single convergent lens which has a projection cone area that covers the effective reception area of the receiving means. The sensing means of the sensing device is connected with a print controller means which drives the printing head and the print controller means is designed so that it either enables or suppresses the printing in response to a sensing signal generated by the sensing device. Preferably, a warning means such as a lamp is provided in the print controller means and is activated when a suppression of the printing occurs due to, for example, damage to the recording medium which was detected by the sensing means.

The convergent lens system is positioned before the reception means so that its focal point is situated in the immediate proximity of the reflecting surface that receives the radiation so that it planarly projects a reflected beam regardless of its deviation from the desired direction onto the reception surface of the receiving means. Thus, the sensing system is less sensitive to directional fluctuations of the reflected sensing beam. Excursions or movements of the reflective surface condition, for example, by pressure of the recording medium, will cause a deflection of the reflected beam from a given path. However, the convergent lens system will still receive the deflected beam and these movements do not lead to deterioration of the function. When the lens system is designed as a single convergent lens, an additional advantage of the invention is that it increases the functional range of the sensing apparatus.

DESCRIPTION OF THE PREFERRED EMBODIMENTS

Figure 1:
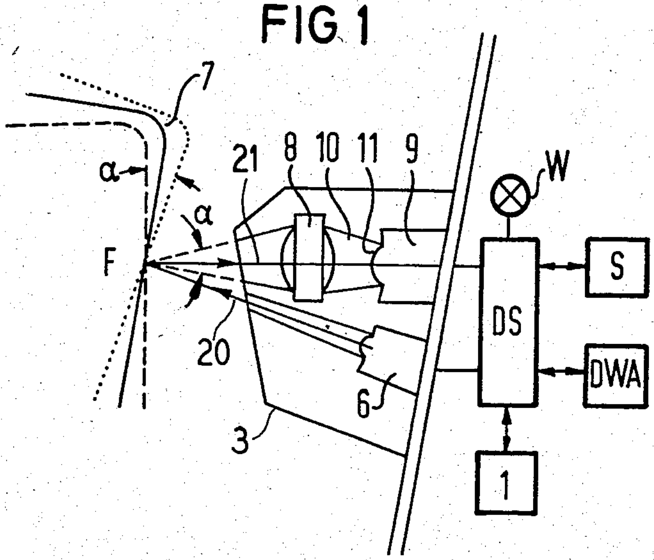
FIG. 1 is a schematic side view of the sensing device of the present invention.
Figure 2:
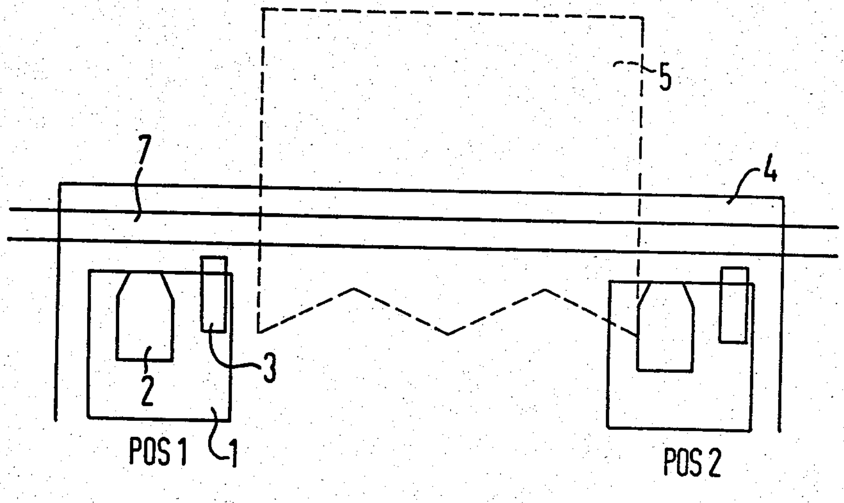
FIG. 2 is a schematic illustration of a line printer device comprising a write head with the sensing device of the present invention showing two end positions for the printing head.

The principles of the present invention are particularly useful when incorporated in a printing device schematically illustrated in FIG. 2. The printing device has a carriage 1 with a writing head 2 which can be either a wire matrix print head or an ink jet printer. In addition, the carriage also supports an opto-electronic sensing means 3. The opto-electronic sensing means 3 serves the purpose of sensing the presence of a recording medium 5 which is illustrated as being stretched across a platen 4. In particular, the sensing means 3 would determine the right- and left-hand edges of the recording medium. The sensing occurs in that before actual printing begins, the print head is moved from a position referenced POS1 on the left-hand side of the platen toward the right to a position referred to as POS2 which is the right-handmost position. The topical position of the side edges of the printing medium are then determined. The position of the left edge is then passed through a print controller means DS (FIG. 1) and recorded in a memory S. The print head 2 is correspondingly positioned via the carriage drive at the beginning of the writing mode in response to these recorded positions.

As best illustrated in FIG. 1, the sensing means 3 includes a radiation source 6 which directs a beam of radiation 20 at a spot or area F of a reflective surface 7 which is positioned behind the recording medium 5 at the platen 4. The sensing means 3 also includes a convergent lens system 8, which is positioned in front of a photoelectric receiver such as a phototransistor 9 in the path of a reflected beam 21. As illustrated, the radiation source 6 may be a light-emitting diode which will direct the beam 21 at a very small reflective region of the area F. The portion of beam 21 reflected by the surface 7 creates the reflected beam 21 which is received by the convergent lens system 8 and projected onto the photoreceiver 9 which may be a phototransducer. The reflective surface 7 may be a polished metal web which, given printers having a wire matrix printing head, extends along the platen 4 below the platen. If the printing head 2 is an ink jet printer or ink mosaic printer, the platen 4 may be entirely eliminated under certain conditions and the reflective surface 7 itself can serve as a print or recording medium support.

When the light beam 20 proceeding from the radiation source 6 impinges on the recording medium 5, for example, paper, then the light beam is greatly attenuated or interrupted by the reduced reflective capacity of the paper. The same reflection condition for the sensings are thus always achieved by means of utilizing a reflective surface. Since in accordance with the illustration of FIG. 2, the paper 5 must be conducted across the reflective surface 7, deformations of the reflective surface can easily occur. Under certain conditions, deformations of the surface 7 will change the angle of incidence and the angle of reflection to cause the beam 21 to be deviated from the desired path or line of reflection. For example, as illustrated, the reflective surface 7 has been moved through an angle $\alpha$ between a position shown in dotted lines and a position shown in broken lines. This movement will cause the reflected beam 21 to be deviated through an angle $\alpha$ which is illustrated in the Figure.

When a convergent lens system 8 is situated on the desired path of the reflected beam 21 in front of the receiver means 9 with its focal point situated on the reflective surface 7 at the area F, then the reflective surface can be pivoted by an angle $\alpha$ without having an influence on the function of the receiving means 9. The convergent lens system 8 planarly projects the reflected beam from the area F at the focal point onto the receiving surface of the receiving means 9. A relatively small deflecting in the region of the area F of the reflective surface thereby becomes a beam cone 10 between the convergent lens 8 and the receiving means 9. The cross-sectional surface of this beam cone 10 or, respectively, the diameter of the beam cone 10 is then dimensioned such that it completely covers an effective reception area 11 of the receiving means 9. The effective reception area 11 of the receiving means can thereby likewise be an input aperture of a convergent lens. Given a corresponding size of the reception area 11, a bi-convex lens can also be employed as the convergent lens 8 or on the other hand a lens having a different curvature surface and thus different focal depths can also be employed as in the case of the convergent lens according to FIG. 1.

A sensing device designed in such a fashion expands the reception region of the phototransducer forming the receiving means 9 to such a great extent that an adjustment of the reflective surface can be omitted even given pronounced shape and positional deviations of the reflected surface 7 relative to the sensor.

The sensing means 3 not only serves for identifying the lateral edges of the recording medium, but it also serves for the suppression of printing when the recording medium is damaged. During a printing mode wherein the printing head 2, which can, for example, be an ink jet printing head, is moved only across the recording medium 5, the sensing means 3 is not switched off but is kept in operation in order to identify local damage. When the sensing means 3 identifies such damage, printing in the region of the damage is suppressed via a printer controller means DS. Dirtying of the platen or, respectively, the mirrored strip forming the reflective surface 7 is thereby prevented. When using the printing apparatus as a message terminal, a warning means W, for example, a lamp, will indicate when damage in the printing medium has been detected and what part of the message stored in the memory could not be represented or printed on the recording medium.

Although various minor modifications may be suggested by those versed in the art, it should be understood that I wish to embody within the scope of the patent granted hereon, all such modifications as reasonably and properly come within the scope of my contribution to the art.

I claim:

1. In a sensing device of a printing apparatus having a printing head movable line-wise along a recording medium which is conducted over a reflective surface, said sensing device having sensing means coupled to move with the printing head for determining the presence of a recording medium in front of the reflective surface, said sensing means including a radiation source for projecting radiation at a spot on the reflective surface and photoelectric receiving means having a receiving surface for receiving a sensing beam reflected from a spot of the reflective surface, the improvements comprising said sensing means including a convergent lens system being disposed in front of the receiving means with one of the focal points of the lens system being positioned in the immediate proximity of said spot on the reflective surface so that the lens system planarly projects the sensing beam onto the receiving surface even when the beam is deflected from a desired path of reflection.

2. In a sensing device according to claim 1, wherein the printing apparatus has print controller means for controlling the operation of the printing head, the sensing means being in communication with the print control means so that said print controller means enables starting and stopping the printing operation in response to the determination of the presence of the recording medium.

3. In a sensing device according to claim 2, wherein the print controller means includes warning means for indicating a stopping of printing during a printing operation due to the sensing means determining damage to the record medium.

4. In a sensing device according to claim 1, wherein the receiving surface has an effective reception area and wherein the convergent lens system has a projection cone area that covers the effective reception area of said receiving surface.

5. In a sensing device according to claim 4, wherein the printing apparatus includes print controller means for controlling the operation of the printing head, said sensing device being connected to the print controller means so that the print controller means enables printing when the presence of a recording medium is determined and suppresses printing when the absence of the recording medium is determined.

6. In a sensing device according to claim 5, wherein the print controller means includes a warning means for indicating a suppression of printing during a printing operation due to a sensed damage of the recording medium by the sensing means.

7. In a sensing device according to claim 1, wherein said convergent lens system consists of a single convergent lens.

8. In a sensing device according to claim 7, wherein said receiving surface has an effective reception area and wherein said single convergent lens has a projection cone area which covers the effective reception area of said receiving surface.

9. In a sensing device according to claim 8, wherein said printing apparatus includes print controller means for controlling the operation of the printing head in response to determination of the presence of a recording medium, said sensing means being connected to said print controller means so that the print controller means enables printing when the presence of a recording medium is determined and suppresses printing if damage to the recording means is determined by said sensing means.

10. In a sensing device according to claim 9, wherein the controller means includes a warning means for indicating a suppression in the printing, said warning means being activated when a suppression of the printing occurs due to the sensing means detecting damage to the recording medium.

11. In a sensing device of a printing apparatus having a printing head movable line-wise along a recording medium which is conducted over a reflective surface, said sensing device having sensing means coupled to move with the printing head for determining the presence of a recording medium in front of the reflective surface, said sensing means including a radiation source for projecting radiation at a spot on the reflective surface and photoelectric receiving means for receiving a sensing beam reflected from the spot of the reflective surface, the improvements comprising said sensing means including lens means for receiving the sensing beam as it is reflected at an angle to its desired path and directing the sensing beam onto a receiving surface of the photoelectric receiving means, said lens means being a convergent lens system with a focal point, said lens system being positioned on the desired path with the focal point being at the spot so that even when the sensing beam is deflected from the desired path, the sensing beam is still projected onto the receiving surface.

* * * * *